Feb. 9, 1926.   1,572,237
E. L. HUNT
SCRIBER CLAMP AND ATTACHING DEVICE
Filed March 9, 1922
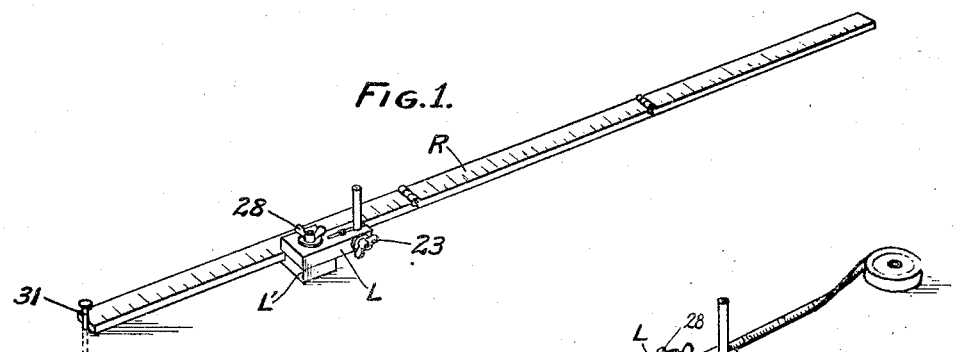
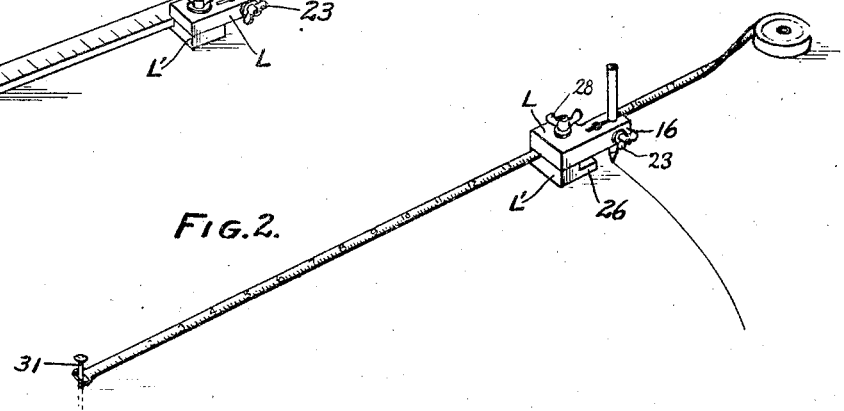
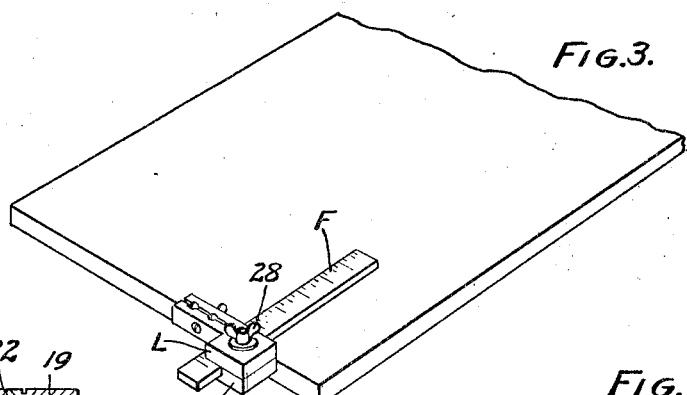
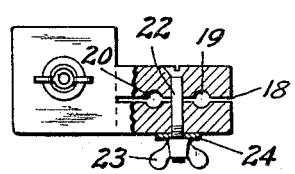
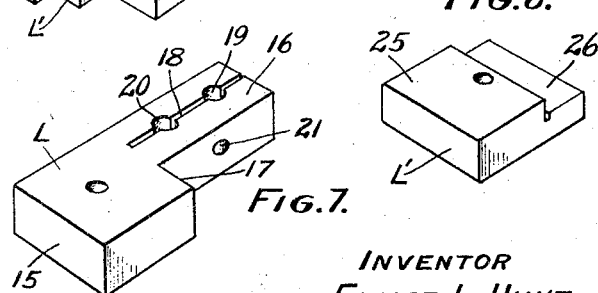
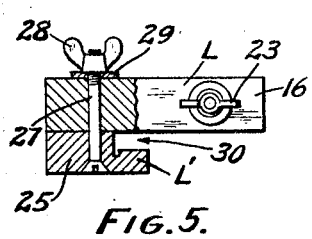
INVENTOR
ELMER L. HUNT
BY Hazard & Miller
ATT'YS.

Patented Feb. 9, 1926.

1,572,237

UNITED STATES PATENT OFFICE.

ELMER L. HUNT, OF LOS ANGELES, CALIFORNIA.

SCRIBER CLAMP AND ATTACHING DEVICE.

Application filed March 9, 1922. Serial No. 542,267.

*To all whom it may concern:*

Be it known that I, ELMER L. HUNT, a citizen of the United States, residing at Los Angeles, in the county of Los Angeles and State of California, have invented new and useful Improvements in Scriber Clamp and Attaching Devices, of which the following is a specification.

My invention relates to measuring instruments, and a purpose of my invention is the provision of an instrument designed for use in conjunction with measuring instruments such as rulers and tape instruments, whereby the latter may perform functions other than those for which the instruments were originally designed.

Although I will describe only one form of measuring instrument embodying my invention and point out the novel features thereof in claims, it is to be understood that various changes and modifications may be made herein without departing from the spirit and scope of such claims.

In the accompanying drawings,

Figure 1 is a view showing in perspective a foldable rule having applied thereto one form of measuring instrument embodying my invention.

Fig. 2 is a view similar to Fig. 1 showing my invention applied to a tape measure.

Fig. 3 is a perspective view of a piece of work having associated therewith a foot rule operating in conjunction with the measuring instrument embodying my invention to form a T-square.

Fig. 4 is an enlarged detail view showing in top plan and partly in section the measuring instrument shown in the preceding views.

Fig. 5 is a view showing in side elevation and partly in section the measuring instrument shown in the preceding views.

Figs. 6 and 7 are detail perspective views of the blocks comprised in the instrument shown in the preceding views.

Similar reference characters refer to similar parts in each of the several views.

Referring specifically to the drawings and particularly to Figs. 4, 5, 6 and 7, my invention, in its present embodiment, comprises a pair of blocks designated at L and L' respectively, constructed of suitable material such as fibre or the like, and the former of which is of substantially L-shape formation and including a substantially square body 15 and an elongated body 16 extending from one side of the body 15. The body 16 is relatively narrow as compared to the body 15 so as to provide at the junction of the two a shoulder 17. The body 16 is split longitudinally as indicated at 18 and within the split portion openings 19 and 20 are formed, either of which is adapted to receive a stylus such as a pencil. An opening 21 extends transversely of the body 16 and receives a screw 22 upon which is mounted a wing nut 23 and a washer 24, the former serving to co-operate with the screw in effecting a constriction of the openings 19 and 20 to cause the arms of the body to securely clamp the stylus. The openings 19 and 20 are of different form so as to accommodate styli of different sizes, as will be understood.

The block L', as clearly illustrated in Fig. 7, includes a body portion 25 and a lip 26 of reduced thickness as compared to the body. In the applied position of the block L' to the block L as shown in Figs. 4 and 5, the block L is disposed uppermost, and a screw 27 is extended through the body portions of both of the blocks and provided with a wing nut 28 and a washer 29, the nut co-operating with the screw in securely clamping the blocks in any desired position with respect to each other. The lip 26 of the block L' co-operates with the body portion 15 to provide a slot 30 in which is adapted to be arranged various forms of measuring instruments.

As shown in Fig. 1, the instrument is adapted to be used in conjunction with a foldable ruler designated at R to form a compass or similar instrument for describing circles or arcs. In this adaptation of my invention, the block L' is positioned with respect to the block L so as to receive the ruler R, and after the ruler has been applied the two blocks are securely clamped to the ruler by manipulation of the nut 28. A pencil is placed within one of the openings 19 or 20 and securely clamped therein by manipulation of the nut 23. With the instrument so applied, one end of the ruler R is preferably notched to engage the nail or other form of stop 31 and about which the ruler is adapted to be rotated. The adjustment of the pencil is such that rotation of the ruler will cause the pencil to describe a line which is curved, and by completely rotating the ruler it will be understood that a circle can be described. The radius of the circle is of course determined by the adjustment of the instrument upon the ruler R, and it will be clear that by loosening the blocks L and L' the instrument can be moved to any desired position along the length of the ruler.

In Fig. 2, I have shown the instrument as applied to a tape measure so as to function in the same manner as described in connection with the ruler R. The looped end of the tape measure is placed over the nail 31 and by holding the tape measure in extended position it will be clear that it can be rotated about the nail as a center. In this adaptation of my invention it is necessary to shift the block L to a position in which the lip 26 is disposed beneath the body portion 16 so that the tape measure extends between and contacts with the body portions 15 and 25. It may thus be securely clamped by a manipulation of the nut 28 so as to firmly hold the instrument in any desired position along the length of the tape measure.

In Fig. 3, the instrument is shown used in conjunction with a foot ruler F to form a square. As shown, the ruler is extended through the slot 30 between the blocks L and L' and securely clamped by actuation of the nut 28. In this position the ruler is disposed at right angles to the longitudinal axis of the instrument thereby co-operating with the latter in forming a square which may be applied to a piece of work as shown.

What I claim is:

1. An instrument of the character described comprising a block, a second block disposed beneath the latter, means extending through the blocks for clamping the same to each other, one portion of the first block being split longitudinally and provided with stylus receiving openings in the split, means for constricting the openings, and a lip formed on the second block extending under the first block for the purpose described.

2. An instrument of the character described comprising an L-shaped block including a rectangular body portion and an elongated body portion extending therefrom, said elongated body portion being split longitudinally and provided with stylus receiving openings in the split portion, a screw extending through the elongated body portion and passing across said split, a nut mounted on the screw and co-operating with the latter to effect a constriction of said openings, a second block, a screw extending through the first and second blocks for securing the two in clamping relation to each other, and a lip formed on one side of the second block adapted to form a slot between the first and second member for the purpose described.

3. The combination with a member having a straight edge, of a pair of clamping members, the upper member having a flat lower face and the lower member having a horizontal recess in which the straight edge member fits and a bolt connecting the two clamping members so that the lower member may be turned relative to the upper member and held in adjusted position, and means for holding a stylus in the upper clamping member transversely of the horizontal recess.

In testimony whereof I have signed my name to this specification.

ELMER L. HUNT.